(12) United States Patent
Gerber et al.

(10) Patent No.: US 12,492,918 B2
(45) Date of Patent: Dec. 9, 2025

(54) MEASURED VALUE ACQUISITION DEVICE FOR AN INDUCTIVE SENSOR ARRANGEMENT

(71) Applicant: Robert Bosch GmbH, Stuttgart (DE)

(72) Inventors: Daniel Gerber, Recklinghausen (DE); Stefan Kuntz, Flein (DE)

(73) Assignee: Robert Bosch GmbH, Stuttgart (DE)

( * ) Notice: Subject to any disclaimer, the term of this patent is extended or adjusted under 35 U.S.C. 154(b) by 197 days.

(21) Appl. No.: 18/457,764

(22) Filed: Aug. 29, 2023

(65) Prior Publication Data
US 2024/0142274 A1 May 2, 2024

(30) Foreign Application Priority Data

Nov. 2, 2022 (DE) ...................... 10 2022 211 560.0

(51) Int. Cl.
*G01D 5/20* (2006.01)
(52) U.S. Cl.
CPC ...................... *G01D 5/20* (2013.01)
(58) Field of Classification Search
CPC ...... G01D 5/20; G01D 5/2053; G01D 5/2086; G01B 7/003; G01B 7/30
See application file for complete search history.

(56) References Cited

U.S. PATENT DOCUMENTS

| | | | |
|---|---|---|---|
| 2020/0200569 A1* | 6/2020 | Utermoehlen | G01D 5/204 |
| 2021/0364272 A1* | 11/2021 | Ausserlechner | G01D 5/2053 |
| 2022/0057281 A1* | 2/2022 | Ausserlechner | G01L 5/0042 |
| 2023/0089358 A1* | 3/2023 | Chen | G01L 5/221 |
| | | | 310/68 B |

FOREIGN PATENT DOCUMENTS

DE    10 2020 206 396 A1    11/2021

\* cited by examiner

*Primary Examiner* — Akm Zakaria
(74) *Attorney, Agent, or Firm* — Maginot, Moore & Beck LLP

(57) ABSTRACT

A measured value acquisition device includes a circuit carrier, which comprises a receiving structure, which comprises a receiving coil having at least two electrically connected windings in series. A single winding comprises two loop structures having periodically repeating loop portions and is formed in at least two planes of the circuit carrier. Portions of the individual loop structures are electrically connected to each other via through-contacts. Loop portions of the individual windings have opposite directions of passage. The loop structures are arranged in a direction of the movement path offset from one another by a predetermined distance. The individual loop structures are separated at a separation point and are connected to each other via a connecting structure to be in series. The connecting structure comprises at least two connecting elements arranged in at least two parallel planes and have opposite directions of passage.

15 Claims, 7 Drawing Sheets

MEASURED VALUE ACQUISITION DEVICE FOR AN INDUCTIVE SENSOR ARRANGEMENT

This application claims priority under 35 U.S.C. § 119 to application no. DE 10 2022 211 560.0, filed on Nov. 2, 2022 in Germany, the disclosure of which is incorporated herein by reference in its entirety.

The disclosure relates to a measured value acquisition device for an inductive sensor arrangement. The object of the present disclosure is also an inductive sensor arrangement having at least one such measured value acquisition device.

BACKGROUND

Inductive rotor position sensors are known from the prior art, which comprise at least one exciter structure, at least one coupling device arranged on a shaft of the rotor to be measured, which is also referred to as a target, and at least one receiving structure. The at least one exciter structure further comprises at least one exciter coil. The at least one coupling device comprises at least one electrically conductive coupling element. The at least one receiving structure comprises at least one, but usually two, receiving coils. A high frequency current passes through the at least one exciter coil generating an alternating magnetic field, which induces eddy currents in the at least one coupling device. In this context, the inductive coupling of the at least one exciter coil and the at least one receiving coil depends on the angular position of the corresponding coupling device. By the induced voltage signal in the at least one receiving coil, the electrical angle of rotation of the coupling device and the current angle of rotation of the shaft or the rotor can be closed.

An inductive angle sensor is known from DE 10 2020 206 396 A1, which comprises an inductive target arrangement with k-fold symmetry as well as a first pickup coil arrangement with k-fold symmetry and a second pickup coil arrangement with k-fold symmetry. A combination device is designed to combine signals of the first pickup coil arrangement with signals of the second pickup coil arrangement and determine an angular error compensated rotation angle based thereon. The pickup individual coils of the first and second pickup coil assemblies are each rotationally offset about the axis of rotation by a geometric offset angle relative to each other. Additionally, the entire first pickup coil arrangement is rotationally offset by a geometric offset angle relative to the entire second pickup coil arrangement about the axis of rotation. In one possible embodiment, the first and second pickup coil arrangements are galvanically coupled to each other and form one or more single pickup coil pairs, wherein, in each pick-p single coil pair, one of the pickup single coils of the first pickup coil arrangement is connected together in a series circuit or parallel circuit with one pickup single coil of the second pickup coil arrangement, which is offset by the geometric offset angle. The combining device is designed to determine the angular error compensated rotation angle between the stator and the rotor based on a combination of the signals of the respective interconnected pickup single coils of the one or more pickup single coil pairs.

SUMMARY

The measured value acquisition device for an inductive sensor arrangement having the features of the disclosure and the inductive sensor arrangement having the features of the disclosure each have the advantage that a series circuit of receiving coil windings can increase an amplitude from a voltage induced in the receiving coil and simultaneously reduce an angular error of the measured value acquisition device or the inductive sensor arrangement.

Embodiments of the present disclosure provide a measured value acquisition device for an inductive sensor arrangement having a circuit carrier that covers a movement path of a coupling device with at least one electrically conductive coupling element that is coupled to a movable body, whose movement is intended to be acquired. The circuit carrier comprises at least one receiving structure comprising at least one receiving coil with at least two windings electrically connected in series. A single winding of the at least one receiving coil comprises two loop structures with periodically repeating loop portions and extends across the movement path of the coupling device and is formed in at least two planes of the circuit carrier. Portions of the individual loop structures arranged in different planes of the circuit carrier are electrically connected to each other via through-contacts. In addition, the periodically repeating loop portions of the two loop structures of the individual windings have opposite directions of passage. The loop structures of the at least two windings of the at least one receiving coil, which are electrically connected in series, are arranged offset from one another by a predetermined distance in the direction of the movement path. The individual loop structures of the at least two windings of the at least one receiving coil are in this case separated at at least one separation point and connected to each other via at least one connecting structure in such a way that an electrical series connection of the at least two windings is created. The at least one connecting structure comprises at least two connecting elements, which are arranged in at least two parallel planes and have opposite directions of passage.

The arrangement of the at least two connecting elements results in a differential construction of the at least one connecting structure. The advantage of such a differential construction is that it is not prone to interference fields. Due to the differential construction of the at least one connecting structure and the opposite directions of passage of the at least two connecting elements, the areas spanned parallel to the areas of the windings of the at least one receiving coil have opposite area normals and cancel each other out. As a result, there is only a smaller amount of interference resulting from an area, which is spanned by the distance between the at least two connecting elements and the length of the at least two connecting elements. In addition, the at least one connecting structure enables any desired combination of the number of windings, receiving structures and receiving coils.

In addition, an inductive sensor arrangement is proposed for acquiring a movement of a movable body, comprising at least one movable coupling device coupled to the movable body, as well as such a measured value acquisition device. In this case, at least one exciter structure is arranged on a circuit carrier of the measured value acquisition device. The at least one exciter structure is coupled to at least one oscillator circuit which, during operation, couples a periodic change signal into the at least one exciter structure. The at least one movable coupling device is designed to influence an inductive coupling between the at least one exciter structure and the at least one receiving structure of the measured value acquisition device, whereby at least one analysis and control unit is designed to evaluate signals induced in the at least one receiving structure and to determine a current position of the movable body.

The inductive sensor arrangement can, e.g., be designed as a rotation angle sensor or rotor position sensor, in which the movable body performs a rotational movement intended to be acquired about an axis of rotation. Alternatively, the inductive sensor arrangement can be designed as a linear path sensor in which the movable body performs linear movement intended to be acquired.

The at least two connecting elements for connecting the at least two windings in series can be arranged both internally and externally to the outer contour of the at least one receiving coil. In a particularly preferred embodiment, the at least two connecting elements can be arranged outside the outer contour of the at least one receiving coil to enable a parallel arrangement of the at least two connecting elements of the individual connecting structures and to enable at least partial overlap of the at least two connecting elements. When designing the inductive sensor arrangement as a rotation angle sensor, in which the windings of the at least one receiving coil are arranged along a circular movement path between an inner radius and an outer radius, the at least two connecting elements can be arranged in the area of the inner radius and/or the area of the outer radius. The amplitudes of the signals induced in the at least one receiving coil are dependent on the areas enclosed by the windings of the at least one receive coil. Therefore, in a particularly preferred embodiment of such a rotary angle sensor, in particular with limited installation space, the at least two connecting elements can only be arranged in the area of the inner radius, since they lead to more loss of the enclosed areas in the area of the outer radius. When designing the inductive sensor arrangement as a linear path sensor, in which the windings of the at least one receiving coil are arranged along a linear movement path between a top edge and a bottom edge, the at least two connecting elements can be arranged in the area of the top edge and/or in the area of the outer edge. In a particularly preferred embodiment of such a linear path sensor, in particular with limited installation space, the at least two connecting elements can be arranged either in the area of the upper edge or in the area of the lower edge in order to reduce the loss of the areas enclosed by the windings of the at least one receiving coil.

The term "analysis and control unit" can in this context be understood to mean an electrical arrangement or electrical circuit that processes or evaluates the sensor signals acquired. Preferably, the analysis and control unit can be designed as an ASIC module (ASIC: application-specific integrated circuit). The analysis and control unit can comprise at least one interface, which can be designed in the form of hardware and/or software. In a hardware design, the interfaces can, e.g., be part of the ASIC device. However, it is also possible that the interfaces be separate integrated circuits, or consist at least in part of discrete components. In a software design, the interfaces can, e.g., be software modules provided on a microcontroller alongside other software modules.

The exciter structure is hereinafter understood to mean an exciter coil having a predetermined number of windings, which transmits the alternating signal coupled in by the at least one oscillator circuit.

Advantageous improvements to the measured value acquisition device for an inductive sensor arrangement specified in disclosure and to the inductive sensor arrangement indicated in the disclosure are made possible by the measures and embodiments specified in the disclosure.

It is particularly advantageous that the at least two connecting elements of the at least one connecting structure arranged in at least two planes can at least partially overlap each other. By at least partially overlapping the at least two connecting elements, the interference influences can be reduced further.

In one advantageous embodiment of the measured value acquisition device, the periodically repeating loop portions can each correspond to a complete period of a sinusoidal waveform or a rectangular waveform or a triangular waveform. A number of the periodically repeating loop portions SA can in this case define a periodicity of the receiving structure. Of course, the periodically repeating loop portions can also have another suitable shape.

In another advantageous embodiment of the measured value acquisition device, the portions of the individual loop structures arranged in different planes of the circuit carrier can correspond to, e.g., half a period of repeating loop portions. Alternatively, portions of the individual loop structures arranged in different planes of the circuit carrier can correspond to, e.g., a quarter period of repeating loop portions.

In a further advantageous embodiment of the measured value acquisition device, the at least one separation point of the individual loop structures of the at least two windings can be designed on a through-contact of the corresponding loop structure. Since a contact point is already present on both planes of the circuit carrier at such a through-contact and the associated loop structure is already separated, the separation point can be implemented simply and cost-efficiently by omitting the contact element, which connects the contact points on the two planes of the circuit carrier. In addition, one end of the at least two connecting elements can be contacted at one of the two contact points.

In another advantageous embodiment of the measured value acquisition device, at least one analysis and control unit can be arranged to receive and evaluate signals induced in the at least one receiving structure. Preferably, the at least one analysis and control unit can be looped into one of the at least two connecting elements of the at least one connecting structure. As a result, no additional separation of the windings of the at least one receiving coil is required in order to loop in the at least one analysis and control unit.

In another advantageous embodiment of the measured value acquisition device, loop structures of different windings or of the same winding of the at least one receiving coil can be connected to one another by the at least one connecting structure. In this case, a change in the direction of passage can be achieved by the at least two connecting elements between two loop structures. In other words, the corresponding connecting element can connect two loop structures having different directions of passage.

In another advantageous embodiment of the measured value acquisition device, a number of the connecting structures can be based on a number of windings of the at least one receiving coil. Preferably, the number of connecting structures can be calculated according to Equation (G1).

$$N=(2*n)-1 \tag{G1}$$

where N corresponds to the number of connecting structures and n to the number of windings of the at least one receiving coil.

In another advantageous embodiment of the measured value acquisition device, a distance of adjacent loop structures of the at least one receiving structure can be based on a number of receiving structures and on a number of receiving coils and on a number of windings of the at least one receiving coil and on the periodicity of the at least one receiving structure. In a rotor position sensor, an angular distance of directly adjacent loop structures can be calculated, for example, according to Equation (G2).

$$a = 360°/(2*s*m*n*p) \qquad (G2)$$

where a corresponds to the angular distance, s to a number of the receiving structures, m to a number of receiving coils of the at least one receiving structure, n to the number of windings of the at least one receiving coil, and p to a periodicity of the at least one receiving structure.

In another advantageous embodiment of the measured value acquisition device, the distances of the loop structures of windings of the at least one receiving coil of the same receiving structure can be the same size. In other words, the loop structures of the individual windings of the at least one receiving coil are approximately congruent.

In a further advantageous embodiment of the measured value acquisition device, loop structures of the windings of a plurality of receiving coils can be arranged alternatingly along the movement path. In other words, in the case of two receiving coils, a loop structure of a first receiving coil and then a loop structure of a second receiving coil are arranged followed by a loop structure of the first receiving coil, etc. Alternatively, loop structures of the windings of a plurality of receiving coils can be arranged after the receiving coils grouped along the movement path. In other words, for three windings per receiving coil, first three loop structures of the individual windings of the first receiving coil and then three loop structures of the individual windings of the second receiving coil can be arranged followed by three loop structures of the individual windings of the first receiving coil, etc.

Exemplary embodiments of the disclosure are illustrated in the drawings and explained in greater detail in the subsequent description. In the drawings, identical reference characters refer to components or elements performing identical or similar functions.

DETAILED DESCRIPTION

Figure 1:
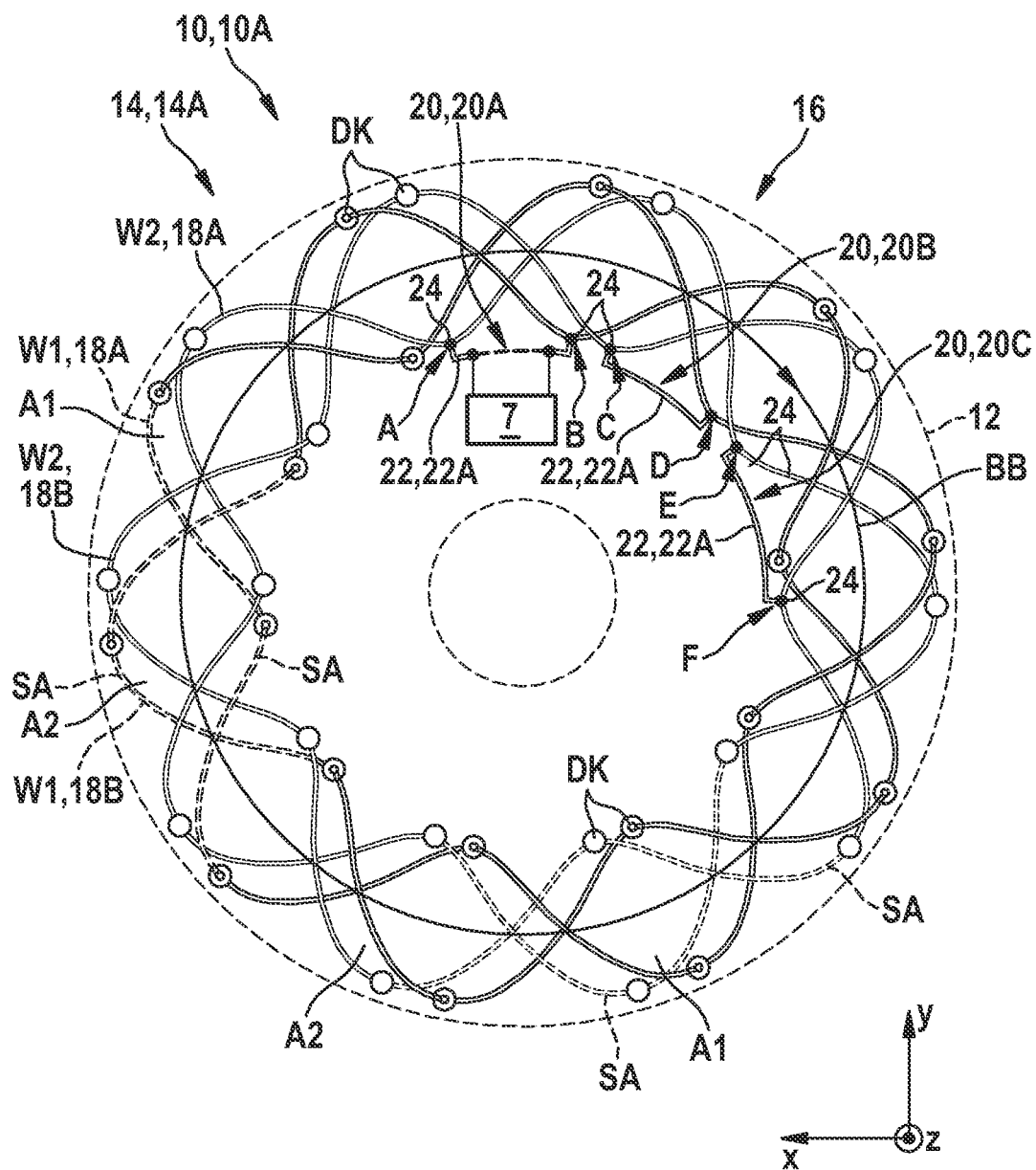
FIG. 1 shows a schematic plan view of a first exemplary embodiment of a measured value acquisition device according to the disclosure for an inductive sensor arrangement, with a circuit carrier of the measured value acquisition device being illustrated as transparent.

As can be seen from FIGS. 1 to 7, the illustrated exemplary embodiments of a measured value acquisition device 10, 10A, 10B, 10C, 10D, 10E for an inductive sensor arrangement 1 according to the disclosure each comprise a circuit carrier 12, which covers a movement path BB of a coupling device 5 with at least one electrically conductive coupling element 5.1. The coupling device 5 is coupled to a movable body 3, the movement of which is intended to be acquired. The circuit carrier 12 comprises at least one receiving structure 14, 14A, 14B, 14C, 14D, 14E comprising at least one receiving coil 16 having at least two windings W1, W2, W3 electrically connected in series. A single winding W1, W2, W3 of the at least one receiving coil 16 each has two loop structures 18A, 18B with periodically repeating loop portions SA and extends across the movement path BB of the coupling device 5 and is formed in at least two planes of the circuit carrier 12. Sections of the individual loop structures 18A, 18B arranged in different planes of the circuit carrier 12 are electrically connected to each other via through-contacts DK. The periodically repeating loop portions SA of the two loop structures 18A, 18B of the individual windings W1, W2, W3 have opposite directions of passage. The loop structures 18A, 18B of the at least two windings W1, W2, W3 of the at least one receiving coil 16, which are electrically connected in series, are arranged offset from one another by a predetermined distance in the direction of the movement path BB. In this case, the individual loop structures 18A, 18B of the at least two windings W1, W2, W3 of the at least one receiving coil 16 are separated at at least one separation point A, B, C, D, E, F and are connected to each other via at least one connecting structure 20, 20A, 20B, 20C, 20D, 20E, so that an electrical series connection of the at least two windings (W1, W2, W3) is formed, whereby the at least one connecting structure 20, 20A, 20B, 20C comprises at least two connecting elements 22, 22A, 22B, which are arranged in at least two parallel planes and have opposite directions of passage.

The illustrated exemplary embodiments of the measured value acquisition device 10, 10A, 10B, 10C, 10D, 10E according to the disclosure are used in an inductive sensor arrangement 1 designed as a rotation position sensor or rotor position sensor, in which the movable body performs a rotational movement intended to be acquired about an axis of rotation DA. As a result, the distance in the direction of the movement path BB of the loop structures 18A, 18B of the at least two windings W1, W2, W3 of the at least one receiving coil 16, which are electrically connected in series, corresponds to an angular distance. In the illustrated exemplary embodiments, the periodically repeating loop portions SA of the two loop structures 18A, 18B of the individual windings W1, W2, W3 are each arranged in the direction of the movement path BB offset from one another by half a period.

As can be further seen from FIGS. 1 to 7, the two connecting elements 22, 22A, 22B arranged in at least two planes at least partially overlap the at least one connecting structure 20, 20A, 20B, 20C. A number N of the connecting structures 20, 20A, 20B, 20C is based on a number n of the windings W1, W2, W3 of the at least one receiving coil 16 and is calculated according to Equation (G1), as indicated hereinabove.

Loop structures 18A, 18B of different windings W1, W2, W3 or of the same winding W1, W2, W3 of the at least one receiving coil 16 can be connected to each other by the at least one connecting structure 20, 20A, 20B, 20C. In this case, a change in the direction of passage can be achieved by the at least two connecting elements 22, 22A, 22B between two loop structures 18A.

As can further be seen from FIGS. 1 to 5 and 7, the periodically repeating loop portions SA in the illustrated exemplary embodiments each correspond to a complete period of a sinusoidal waveform or a rectangular waveform. As can further be seen from FIG. 6, the periodically repeating loop portions SA in the illustrated exemplary embodiment correspond to a complete period of a rectangular waveform. A number of the periodically repeating loop portions SA in this case defines a periodicity of the receiving structure 14. Of course, loop structures 18A, 18B can also have another suitable waveform, e.g. a triangular waveform, in alternative exemplary embodiments (not shown).

As can be further seen from FIGS. 1 to 7, the portions of the individual loop structures 18A, 18B arranged in different planes of the circuit carrier 12 correspond to half a period of repeating loop portions SA in the illustrated exemplary embodiments. Of course, in alternative embodiments (not shown) the portions of the individual loop structures 18A, 18B arranged in different planes of the circuit carrier 12 can also correspond to another portion of the repeating loop portions SA, such as a quarter of a period.

The angular distance a of adjacent loop structures 18A, 18B of the at least one receiving structure 14 is based on a number s of receiving structures 14 and on a number m of receiving coils 16 and on a number n of windings W1, W2, W3 of the at least one receiving coil 16 and on the periodicity p of the at least one receiving structure 14 and calculated according to Equation (G2), as indicated hereinabove. In the illustrated exemplary embodiments, the angular distances of the loop structures 18A, 18B from the windings W1, W2, W3 of the at least one receiving coil 16 of the same receiving structure 14 are the same size.

The fundamental structure of the measured value acquisition device 10 is hereinafter described using the example of the first exemplary embodiment of the measured value acquisition device 10A shown in FIGS. 1 and 2, having a translucent or transparent circuit carrier 12.

Figure 2:
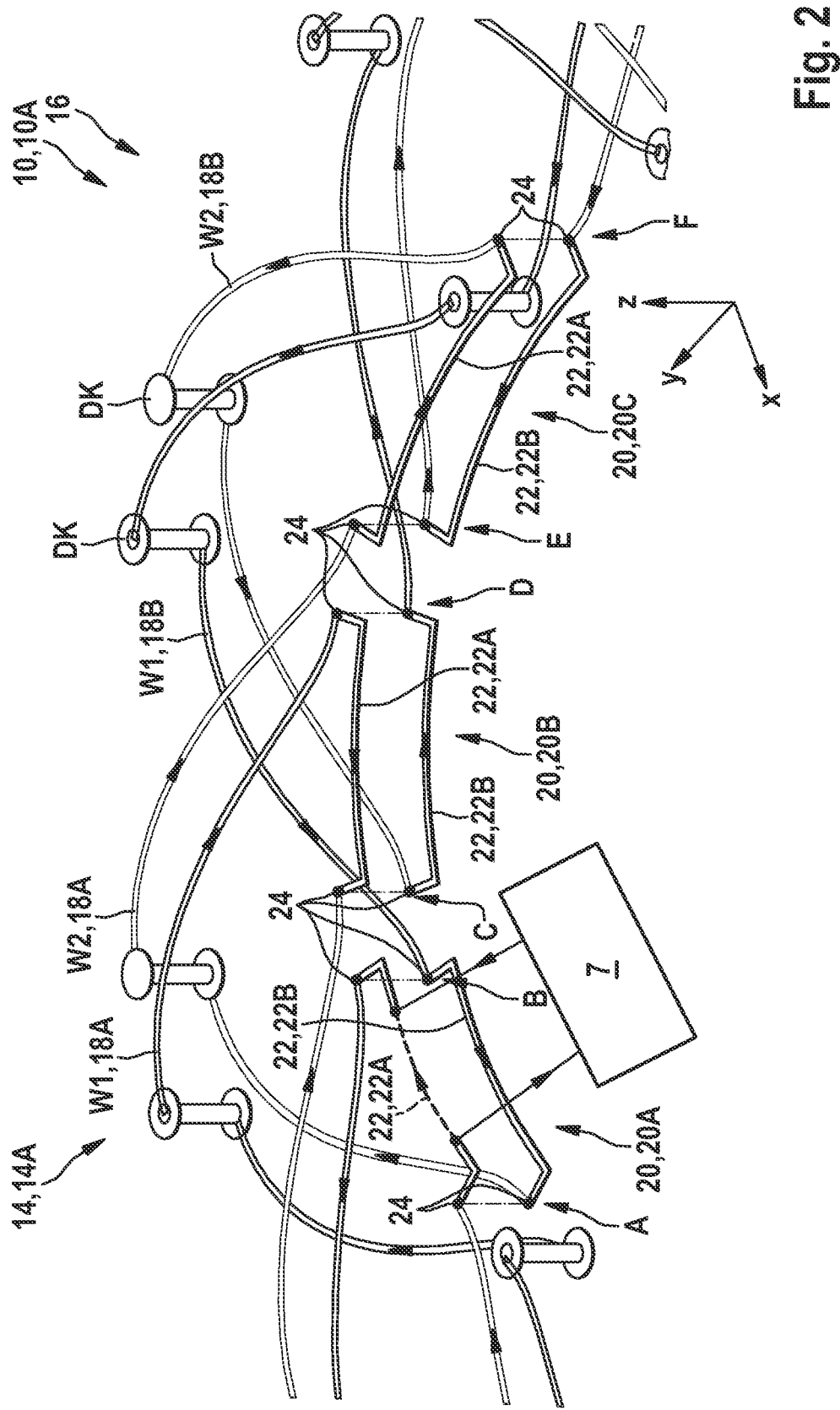
FIG. 2 shows a schematic perspective detailed illustration of the measured value acquisition device according to the disclosure in FIG. 1.

As can be seen further in FIGS. 1 and 2, a receiving structure 14A of the measurement acquisition device 10A comprises a receiving coil 16 having two windings W1, W2, each having two loop structures 18A, 18B with five periodically repeating loop portions SA such that the receiving structure 14A and the receiving coil 16 each feature a periodicity of five (p=5) ID. The number n of the windings W1, W2 corresponds to the value 2. The five periodically repeating loop portions SA each correspond to a complete period of a waveform. As can be further seen from FIGS. 1 and 2, the portions of the individual loop structures 18A, 18B arranged in different planes of the circuit carrier 12 each correspond to half a period of the repeating loop portions SA. The sections of the periodically repeating loop structures SA arranged in different layers are electrically connected to each other via through-contacts DK. Due to the two loop structures 18A, 18B, which are arranged offset to each other by half a period or by 180° in the direction of movement of the circular movement path BB and have opposite directions of passage, which are indicated by corresponding arrows, areas A1, A2 are enclosed between a first loop structure 18A and a second loop structure 18B of the two windings W1, W2 of the receiving coil 16, in which magnetic fields with different orientations are induced. At the periodicity of p=5 of the receiving coil 16, five pairs of areas A1, A2 are enclosed between the two loop structures 18A, 18B of the windings W1, W2, which are electrically connected in series.

The number N of connecting structures 20, 20A, 20B, 20C is calculated according to Equation (G1) and is based on the number n of windings W1, W2 of the receiving coil 16. As can be further seen from FIGS. 1 and 2, the measured value acquisition device 10A in the illustrated exemplary embodiment comprises three connecting structures 20, 20A, 20B, 20C, each having two connecting elements 22A, 22B. To produce the electrical series circuit of the two windings W1, W2 of the receiving coil 16, the individual loop structures 18A, 18B of the two windings W1, W2 are separated at six separation points A, B, C, D, E, F. At a first separation point A, the first loop structure 18A of the second winding W2 is in this case separated. At a second separation point A, the second loop structure 18B of the first winding W1 is separated. At a third separation point C, the second loop structure 18B of the second winding W2 is separated. At a fourth separation point D, the first loop structure 18A of the first winding W1 is separated. At a fifth separation point E, the first loop structure 18A of the second winding W2 is separated and at a sixth separation point F, the second loop structure 18B of the second winding W2 is separated. As can further be seen from FIGS. 1 and 2, the separation points A, B, C, D, E, F of the individual loop structures 18A, 18B of the two windings W1, W2 are each formed on a through-contact DK of the corresponding loop structure 18A, 18B. In other words, the contact locations of the through-contacts DK arranged in different planes of the circuit carrier 12 can be used as contact points 24 for the electrical contacting of the connecting elements 22A, 22B of the connecting structures 20, 20A, 20B, 20C without establishing an electrical connection between the contact points arranged in different planes of the circuit carrier 12.

As further shown in FIGS. 1 and 2, a first connecting structure 20A is arranged between the first separation point A and the second separation point B, wherein a first connecting element 22A of the first connecting structure 20A connects a portion of the first loop structure 18A of the second winding W2 arranged in a first plane of the circuit carrier 12 to a portion of the second loop structure 18B of the first winding W1 arranged in the first plane of the circuit carrier 12, and a second connecting element 22B of the first connecting structure 20A connects a portion of the first loop structure 18A of the second winding W2 arranged in a second plane of the circuit carrier 12 to a portion of the second loop structure 18B of the first winding W1 arranged in the second plane of the circuit carrier 12. A second connecting structure 20B is arranged between the third separation point C and the fourth separation point D, wherein a first connecting element 22A of the second connecting structure 20B connects a first loop structure 18A portion of the first winding W1 arranged in the first plane of the circuit carrier 12 to a second loop structure 18B portion of the second winding W2 arranged in the first plane of the circuit carrier 12, and a second connecting element 22B of the second connecting structure 20B connects a portion of the first loop structure 18A of the first winding W1 arranged in the second plane of the circuit carrier 12 to a portion of the second loop structure 18B of the second winding W2 arranged in the second plane of the circuit carrier 12. A third connecting structure 20C is arranged between the fifth separation point E and the sixth separation point F, wherein a first connecting element 22A of the third connecting structure 20C connects a portion of the first loop structure 18A of the second winding W2 arranged in the first plane of the circuit carrier 12 to a portion of the second loop structure 18B of the second winding W2 arranged in the first plane of the circuit carrier 12, and a second connecting element 22B of the third connecting structure 20C connects a portion of the first loop structure 18A of the second winding W2 arranged in the second plane of the circuit carrier 12 to a portion of the second loop structure 18B of the second winding W2 arranged in the second plane of the circuit carrier 12. As can be further seen from FIGS. 1 and 2, the connecting structures 20, 20A, 20B, 20C are arranged in the area of an inner radius of the area of the circuit carrier 12 covered by the receiving coil 16.

In the illustrated exemplary embodiments of the measured value acquisition devices 10, at least one analysis and control unit 7 is arranged to receive and evaluate signals induced in the at least one receiving structure 14. As can be further seen from FIGS. 1 and 2, in the illustrated first embodiment of the measured value acquisition device 10A, an analysis and control unit 7 is looped into the first connecting element 22A of the first connecting structure 20A. In other words, the first connecting element 22A of the first connecting structure 20A is separated and the contact point 24 of the first loop structure 18B of the second winding W2 arranged at the first separation point A is electrically connected to a first measuring connection of the analysis and control unit 7. In addition, the contact point 24 of the second loop structure 18B of the first winding W1 arranged at the second separation point B is electrically connected to a second measuring connection of the analysis and control unit 7. The separation of the first connecting element 22A is indicated by the dashed representation of the first connecting element 22A.

Referring to FIGS. 1 and 2, a passage of the windings W1, W2 of the receiving coil 16, which are electrically connected in series, is described. Starting from the second measurement connection of the analysis and control unit 7 and the remaining portion of the first connecting element 22A of the first connecting structure 20A, the second loop structure 18B of the first winding W1 of the receiving coil 16 is passed through in a counter-clockwise direction and the second connecting element 22B of the first connecting structure 20A is completely passed through. After passing through the second connecting element 22B of the first connecting structure 20A, the direction of passage changes and a portion of the first loop structure 18A of the second winding W2 is passed through clockwise between the first separation point A and the fifth separation point E and the first connecting element 22A of the third connecting structure 20C. After passing through the first connecting element 22A of the third connecting structure 20C, the direction of passage changes and a portion of the second loop structure 18B of the second winding W2 is passed through between the sixth separation point F and the third separation point C. At the third separation point C, the direction of passage and the second connecting element 22B of the second connecting structure 20B changes and the subsequent first loop structure 18A of the first winding W1 is passed through clockwise completely. After completely passing through the first loop structure 18A of the first winding W1, the direction of passage changes and the first connecting element 22A of the second connecting structure 20B and a subsequent portion of the second loop structure 18B of the second winding W2 between the third separation point C and the sixth separation point F, as well as the second connecting element 22B of the third connecting structure 20C, are passed through in a counter-clockwise direction. After passing through the second connecting element 22B of the third connecting structure 20C, the direction of passage changes and a portion of the first loop structure 18A of the second winding W2 between the fifth separation point E and the first separation point A and the remaining section of the first connecting element 22A of the first connecting structure 20A up to the first measuring connection of the analysis and control unit 7 are passed through in a clockwise direction.

Figure 3:
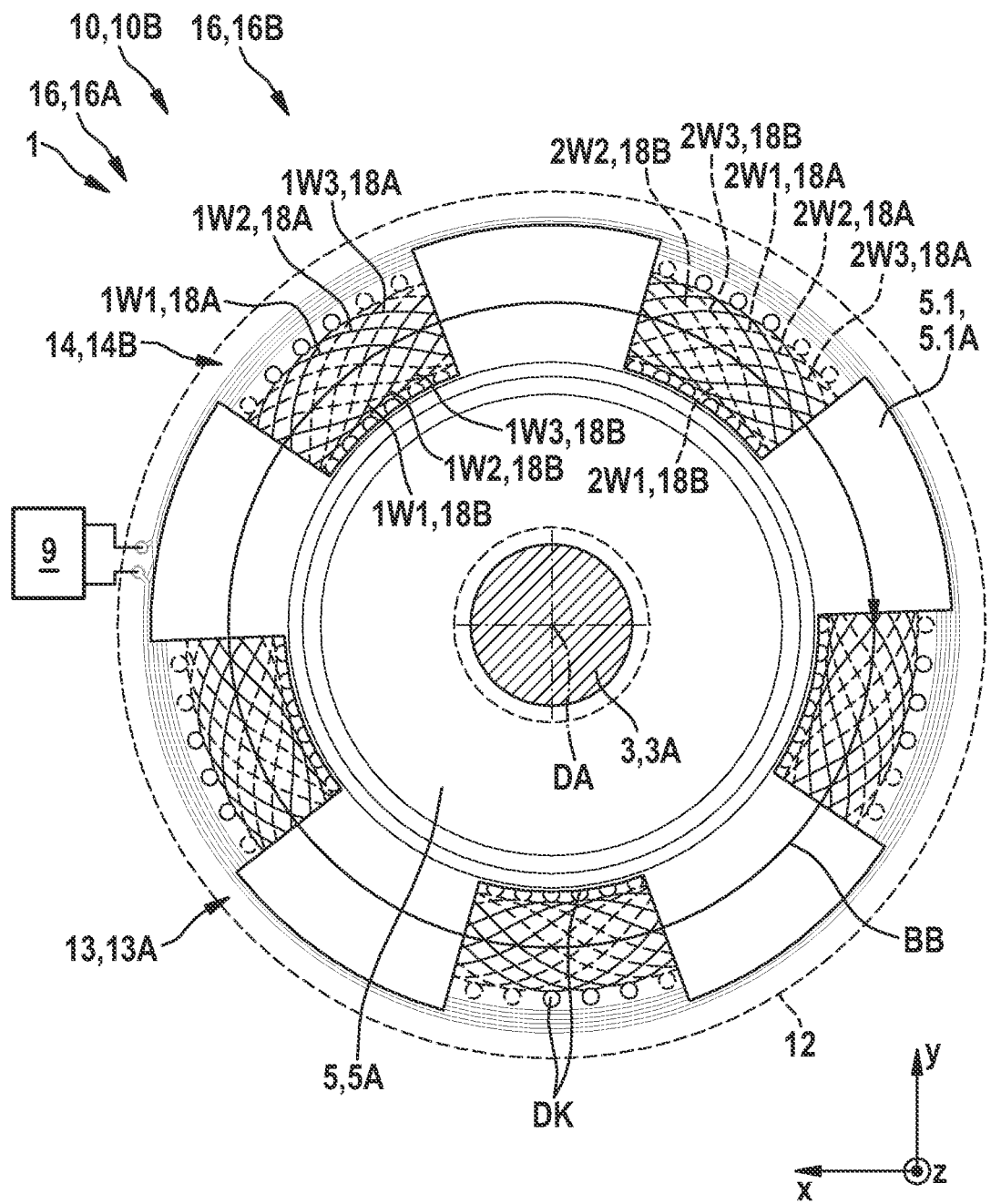
FIG. 3 shows a schematic plan view of an exemplary embodiment of an inductive sensor arrangement according to the disclosure with a second exemplary embodiment of a measured value acquisition device according to the disclosure, with a circuit carrier of the measured value acquisition device being illustrated as transparent.
Figure 4:
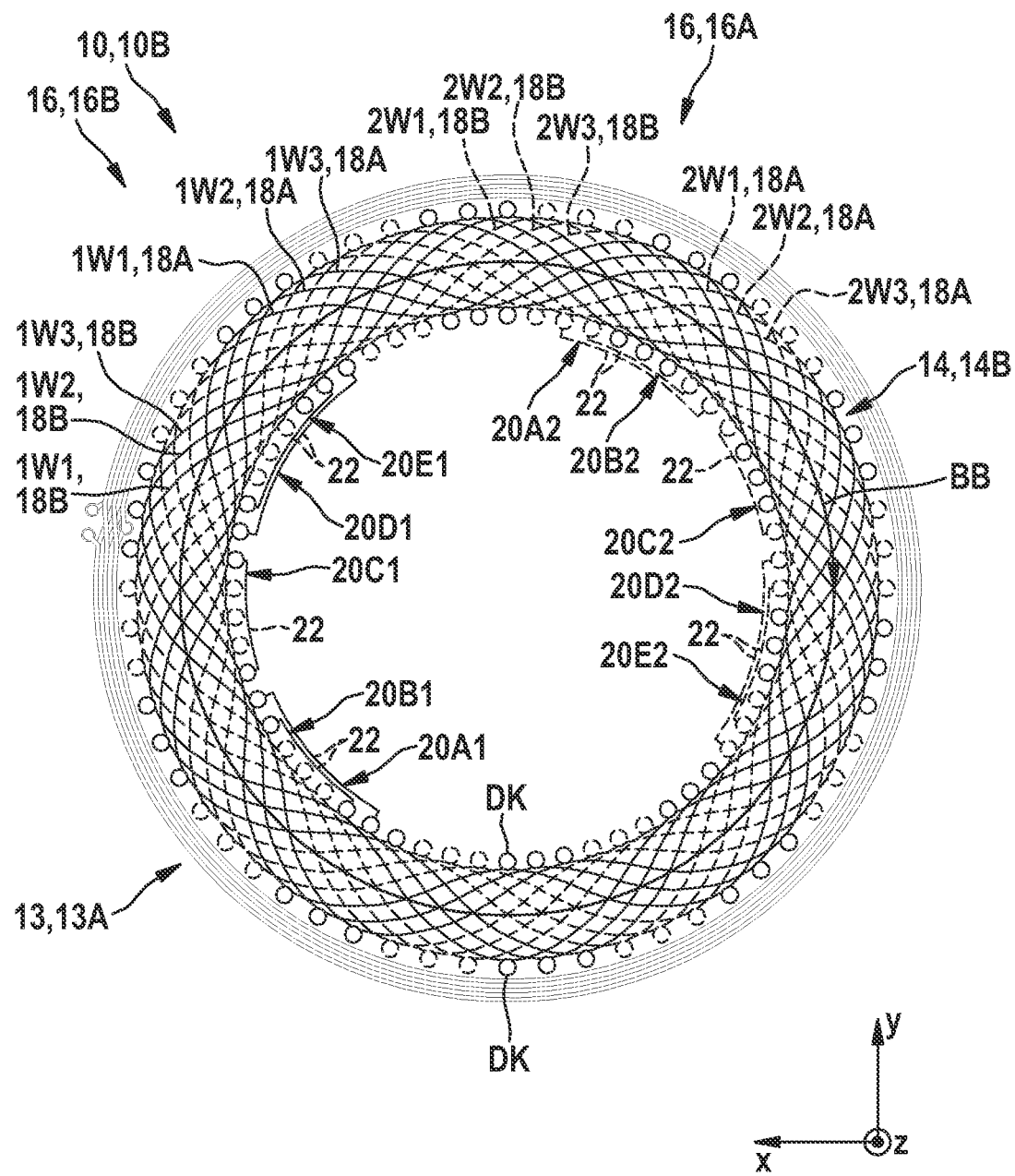
FIG. 4 shows a schematic plan view of the measured value acquisition device according to the disclosure in FIG. 3.

As can be further seen from FIGS. 3 and 4, the illustrated exemplary embodiment of an inductive sensor arrangement 1 according to the disclosure for acquiring movement of a movable body 3 comprises at least one movable coupling device 5 coupled to the movable body 3 and a measured value acquisition device 10 according to the disclosure. In this case, at least one exciter structure 13 is arranged on the circuit carrier 12 of the measured value acquisition device 10, which is shown translucently or transparently. The at least one exciter structure 13 is coupled to at least one oscillator circuit 9 which, during operation, couples a periodic change signal into the at least one exciter structure 13. The at least one movable coupling device 5 influences an inductive coupling between the at least one exciter structure 13 and the at least one receiving structure 14 of the measured value acquisition device 10. At least one analysis and control unit not shown in detail receives and evaluates signals induced in the at least one receiving structure 14 and determines a current position of the movable body 3.

In the illustrated exemplary embodiment, the movable body 3 is a shaft 3A that performs a rotational movement along the circular movement path BB around the axis of rotation DA. In an alternative exemplary embodiment of the inductive sensor arrangement 1, the movable body 3 performs a linear movement, which is intended to be acquired and evaluated by the inductive sensor arrangement 1.

As can be seen further from FIGS. 3 and 4, the coupling device 5 in the illustrated exemplary embodiment is designed as a rotor 5A with five electrically conductive coupling segments 5.1 designed as wings 5.1A and connected to the shaft 3A in a rotationally fixed manner. The exciter structure 13 comprises an exciter coil 13A and is arranged radially outside of the receiving structure 14 and coupled to the oscillator circuit 9, which during operation couples a periodic change signal to the exciter coil 13A. The coupling device 5 rotatable about the axis of rotation DA influences an inductive coupling between the exciter coil 13A and the receiving structure 14. Similar to the analysis and control unit 7 of the first exemplary embodiment of the measured value acquisition device 10A shown in FIGS. 1 and 2, the analysis and control unit of the second exemplary embodiment of the measured value acquisition device 10B not shown in FIGS. 3 and 4 receives and evaluates signals induced in the receiving structure 14 and determines a current angle of rotation of the rotatable body 3.

As can be further seen from FIGS. 3 and 4, the measured value acquisition device 10B in the illustrated second exemplary embodiment comprises a receiving structure 14B with two receiving coils 16A, 16B, each comprising three windings 1W1, 1W2, 1W3, 2W1, 2W2, 2W3. The three windings 1W1, 1W2, 1W3, 2W1, 2W2, 2W3 of the two receiving coils 16A, 16B each have two loop structures 18A, 18B with five periodically repeating loop portions, such that the receiving structure 14B or the receiving coils 16A, 16B feature a periodicity of five (p=5). Similar to the first exemplary embodiment, the periodically repeating loop portions correspond to a full period of a sinusoidal waveform, and the portions of the individual loop structures 18A, 18B arranged in different planes of the circuit carrier 12 each correspond to half a period of the repeating loop portions. The portions of the periodically repeating loop portions arranged in different layers are electrically connected to each other via through-contacts DK.

The number N of connecting structures 20A1, 20B1, 20C1, 20D1, 20E1 of a first receiving coil 16A and the number N of connecting structures 20A2, 20B2, 20C2, 20D2, 20E2 of a second receiving coil 16B are calculated in a manner similar to the first exemplary embodiment according to Equation (G1). As can be further seen from FIGS. 3 and 4, in the illustrated exemplary embodiment, the measured value acquisition device 10B comprises five connecting structures 20A1, 20B1, 20C1, 20D1, 20E1 each having two connecting elements 22A, 22B for the first receiving coil 16A and five connecting structures 20A2, 20B2, 20C2, 20D2, 20E2 having two connecting elements 22A, 22B for the second receiving coil. The manufacture of the electrical series circuit of the three windings 1W1, 1W2, 1W3 of the first receiving coil 16A and the three windings 2W1, 2W2, 2W3 of the second receiving coil 16B is similar to the embodiments of FIGS. 1 and 2 of the first exemplary embodiment. Similar to the first exemplary embodiment, the connecting structures 20A1, 20B1, 20C1, 20D1, 20E1 of the first receiving coil 16A and the connecting structures 20A2, 20B2, 20C2, 20D2, 20E2 of the second receiving coil 16B are arranged in the area of the inner radius of the area of the circuit carrier 12 covered by the receiving coils 16A, 16B. As can be further seen from FIGS. 3 and 4, the loop structures 18A, 18B of the three windings 1W1, 1W2, 1W3, 2W1, 2W2, 2W3 of the two receiving coils 16A, 16B are arranged after the receiving coils 16 grouped along the movement path BB. As a result, three first loop structures 18A of a first winding 1W1, a second winding 1W2 and a third winding 1W3 of the first receiving coil 16A are arranged adjacent to one other. Subsequently, three first loop structures 18A of a first winding 2W1, a second winding 2W2, and a third winding 2W3 of the second receiving coil 16B are arranged adjacent to one other. Subsequently, three second loop structures 18B of a first winding 2W1, the second winding 2W2 and the third winding 2W3 of the first receiving coil 16B are arranged adjacent to one other. Subsequently, three second loop structures 18B of the first winding 2W1, the second winding 2W2 and the third winding 2W3 of the second receiving coil 16B are arranged adjacent to one other. This sequence is repeated for the five periods of the three windings 1W1, 1W2, 1W3, 2W1, 2W2, 2W3 of the two receiving coils 16A, 16B.

Figure 5:
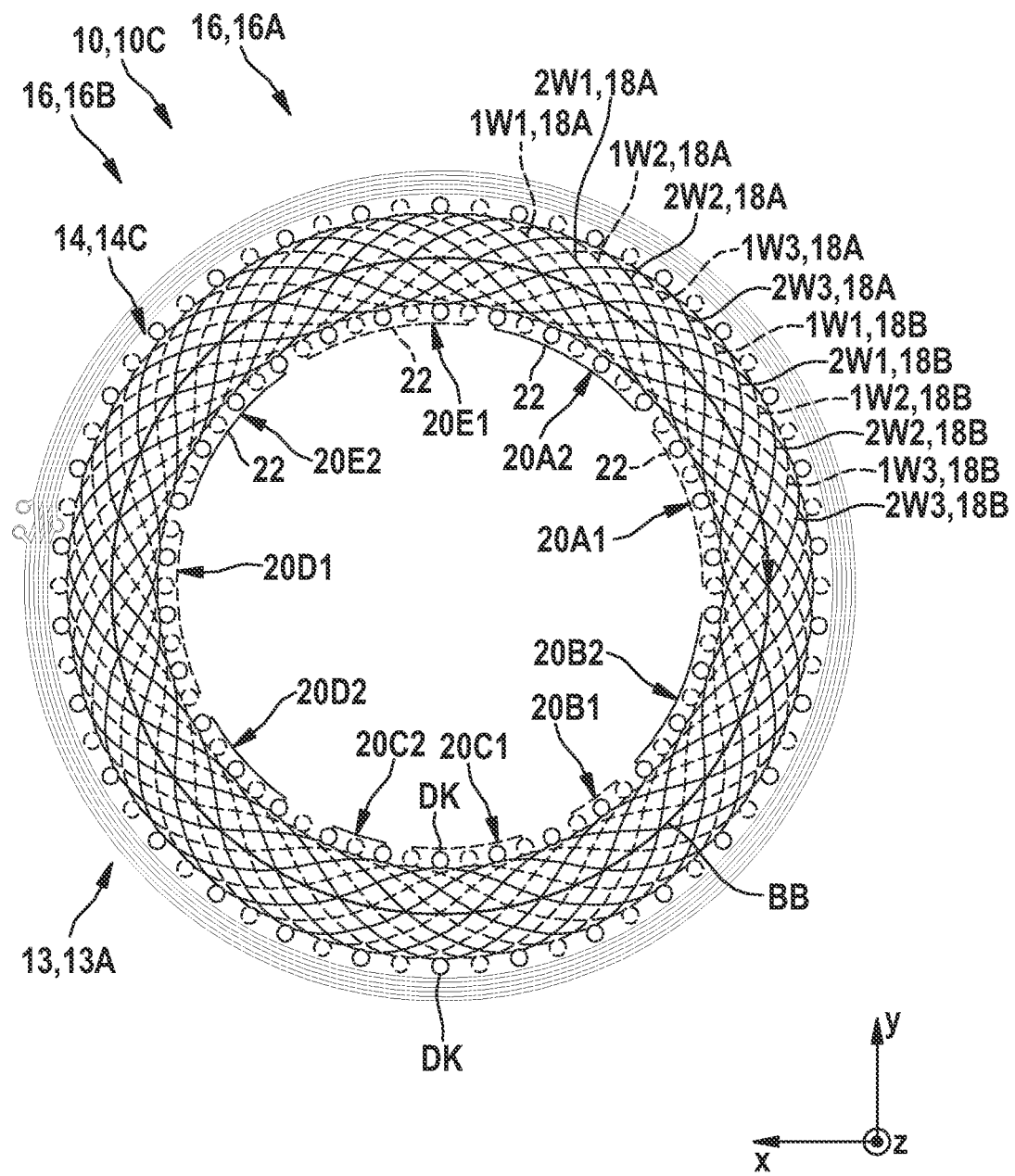
FIG. 5 shows a schematic plan view of a third embodiment of a measured value acquisition device according to the disclosure for an inductive sensor arrangement, with a circuit carrier of the measured value acquisition device being illustrated as transparent.

As can be further seen from FIG. 5, the measured value acquisition device 10C in the illustrated third exemplary embodiment comprises a receiving structure 14C with two receiving coils 16A, 16B, which each have three windings 1W1, 1W2, 1W3, 2W1, 2W2, 2W3 in a manner similar to the second exemplary embodiment. The three windings 1W1, 1W2, 1W3, 2W1, 2W2, 2W3 of the two receiving coils 16A, 16B each have two loop structures 18A, 18B with periodically repeating five loop portions, such that the receiving structure 14C and the receiving coils 16A, 16B have a periodicity of five (p=5). Similar to the first and second embodiments, the periodically repeating loop portions each correspond to a full period of a sinusoidal waveform, and the portions of the individual loop structures 18A, 18B arranged in different planes of the circuit carrier 12 each correspond to half a period of the repeating loop portions. The portions of the periodically repeating loop portions arranged in different layers are electrically connected to each other via through-contacts DK.

The number N of connecting structures 20A1, 20B1, 20C1, 20D1, 20E1 of a first receiving coil 16A and the number N of connecting structures 20A2, 20B2, 20C2, 20D2, 20E2 of a second receiving coil 16B are calculated in a manner similar to the first and second exemplary embodiments according to Equation (G1). As can be further seen from FIG. 5, in the illustrated exemplary embodiment, the measured value acquisition device 10C comprises five connecting structures 20A1, 20B1, 20C1, 20D1, 20E1 each having two connecting elements 22A, 22B for the first receiving coil 16A and five connecting structures 20A2, 20B2, 20C2, 20D2, 20E2 having two connecting elements 22A, 22B for the second receiving coil 16B. The manufacture of the electrical series circuit of the three windings 1W1, 1W2, 1W3 of the first receiving coil 16A and the three windings 2W1, 2W2, 2W3 of the second receiving coil 16B is similar to the embodiments of FIGS. 1 and 2 of the first exemplary embodiment. Similar to the first and second exemplary embodiment, the connecting structures 20A1, 20B1, 20C1, 20D1, 20E1 of the first receiving coil 16A and the connecting structures 20A2, 20B2, 20C2, 20D2, 20E2 of the second receiving coil 16B are arranged in the area of the inner radius of the area of the circuit carrier 12 covered by the receiving coils 16A, 16B. As can be further seen from FIG. 5, the loop structures 18A, 18B of the three windings 1W1, 1W2, 1W3, 2W1, 2W2, 2W3 of the two receiving coils 16A, 16B are arranged alternatingly along the movement path BB, in contrast to the exemplary embodiment shown in FIGS. 3 and 4. As a result, a first loop structure 18A of a first winding 1W1 of the first receiving coil 16A followed by a first loop structure 18A of a first winding 1W2 of the second receiving coil 16B, which is followed by a first loop structure 18A of a second winding 2W1 of the first receiving coil 16A, followed by a first loop structure 18A of a second winding 2W2 of the second receiving coil 16B, followed by a first loop structure 18A of a third winding 3W1 of the first receiving coil 16A, followed by a first loop structure 18A of a third winding 3W2 of the second receiving coil 16B. Subsequently, a second loop structure 18B of the first winding 1W1 of the first receiving coil 16A followed by a second loop structure 18B of the first winding 1W2 of the second receiving coil 16B, followed by a second loop structure 18b of the second winding 2W1 of the first receiving coil 16A, followed by a second loop structure 18B of the second winding 2W2 of the second receiving coil 16B, followed by a second loop structure 18B of the third winding 3W1 of the first receiving coil 16A, followed by a second loop structure 18B of the third winding 3W2 of the second receiving coil 16B. This sequence is repeated for the five periods of the three windings 1W1, 1W2, 1W3, 2W1, 2W2, 2W3 of the two receiving coils 16A, 16B.

Figure 6:
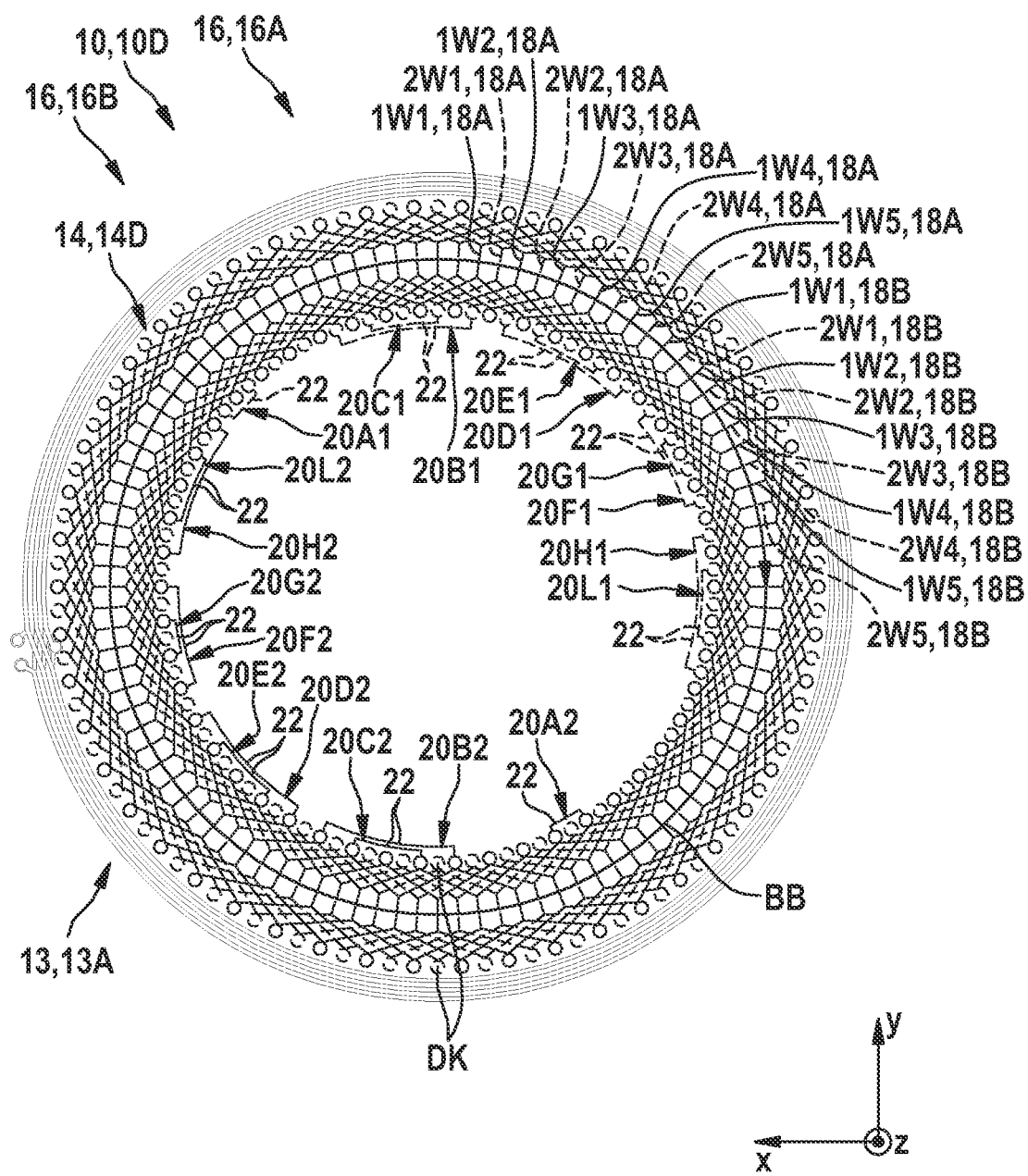
FIG. 6 shows a schematic plan view of a fourth exemplary embodiment of a measured value acquisition device according to the disclosure for an inductive sensor arrangement, with a circuit carrier of the measured value acquisition device being illustrated as transparent.

As can be further seen from FIG. 6, in the fourth exemplary embodiment shown, the measured value acquisition device 10D comprises, similar to the second and third exemplary embodiments, a receiving structure 14D with two receiving coils 16A, 16B. In contrast to the second and third exemplary embodiments, the two receiving coils 16A, 16B each comprise five windings 1W1, 1W2, 1W3, 1W4, 1W5, 2W1, 2W2, 2W3, 2W4, 2W5. The five windings 1W1, 1W2, 1W3, 1W4, 1W5, 2W1, 2W2, 2W3, 2W4, 2W5 of the two receiving coils 16A, 16B each have two loop structures 18A, 18B with five periodically repeating loop portions, such that the receiving structure 14D and the receiving coils 16A, 16B have a periodicity of five (p=5). In contrast to the two previous exemplary embodiments, the periodically repeating loop portions each correspond to a full period of a rectangular waveform, and the portions of the individual loop structures 18A, 18B arranged in different planes of the circuit carrier 12 each correspond to half a period of the repeating loop portions. The portions of the periodically repeating loop portions arranged in different layers are electrically connected to each other via through-contacts DK.

The number N of connecting structures 20A1, 20B1, 20C1, 20D1, 20E1, 20F1, 20G1, 20H1, 20L1 of a first receiving coil 16A and the number N of connecting structures 20A2, 20B2, 20C2, 20D2, 20E2, 20F2, 20G2, 20H2, 20L2 of a second receiving coil 16B are calculated in a manner similar to the previous exemplary embodiment according to Equation (G1). As can further be seen from FIG. 6, in the illustrated exemplary embodiment, the measured value acquisition device 10D comprises nine connecting structures 20A1, 20B1, 20C1, 20D1, 20E1, 20F1, 20G1, 20H1, 20L1 each having two connecting elements 22A, 22B for the first receiving coil 16A and nine connecting structures 20A2, 20B2, 20C2, 20D2, 20E2, 20F2, 20G2, 20H2, 20L2 having two connecting elements 22A, 22B each for the first receiving coil 16B. The manufacture of the electrical series connection of the five windings 1W1, 1W2, 1W3, 1W4, 1W5 of the first receiving coil 16A and the five windings 2W1, 2W2, 2W3, 2W4, 2W5 of the second receiving coil 16B is similar to the embodiments of FIGS. 1 and 2 of the first exemplary embodiment. Similar to the previous exemplary embodiments, the connecting structures 20A1, 20B1, 20C1, 20D1, 20E1, 20F1, 20G1, 20H1, 20L1 of the first receiving coil 16A and the connecting structures 20B2, 20C2, 20D2, 20E2, 20F2, 20G2, 20H2, 20L2 of the second receiving coil 16B are arranged in the area of the inner radius of the area of the circuit carrier 12 covered by the receiving coils 16A, 16B. As can further be seen from FIG. 6, the loop structures 18A, 18B of the five windings 1W1, 1W2, 1W3, 1W4, 1W5, 2W1, 2W2, 2W3, 2W4, 2W5 of the two receiving coils 16A, 16B are arranged in a manner similar to the exemplary embodiment shown in FIG. 5, alternating along the movement path BB. As a result, a first loop structure 18A of a first winding 1W1 of the first receiving coil 16A followed by a first loop structure 18A of a first winding 1W2 of the second receiving coil 16B, which is followed by a first loop structure 18A of a second winding 2W1 of the first receiving coil 16A, followed by a first loop structure 18A of a second winding 2W2 of the second receiving coil 16B, followed by a first loop structure 18A of a third winding 3W1 of the first receiving coil 16A, followed by a first loop structure 18A of a third winding 3W2 of the second receiving coil 16B, followed by a first loop structure 18A of a fourth winding 4W1 of the first receiving coil 16A, followed by a first loop structure 18A of a fourth winding 4W2 of the second receiving coil 16B, followed by a first loop structure 18A of a fifth winding 5W1 of the first receiving coil 16A, followed by a first loop structure 18A of a fifth winding 5W2 of the second receiving coil 16B. Subsequently, a second loop structure 18B of the first winding 1W1 of the first receiving coil 16A is followed by a second loop structure 18B of the first winding 1W2 of the second receiving coil 16B, followed by a second loop structure 18*b* of the second winding 2W1 of the first receiving coil 16A, followed by a second loop structure 18B of the second winding 2W2 of the second receiving coil 16B, followed by a second loop structure 18B of the third winding 3W1 of the first receiving coil 16A, followed by a second loop structure 18B of the third winding 3W2 of the second receiving coil 16B, followed by a second loop structure 18B of the fourth winding 4W1 of the first receiving coil 16A, followed by a second loop structure 18B of the fourth winding 4W2 of the second receiving coil 16B, followed by a second loop structure 18B of the fifth winding 5W1 of the first receiving coil 16A, followed by a second loop structure 18B of the fifth winding 5W2 of the second receiving coil 16B. This sequence is repeated for the five periods of the five windings 1W1, 1W2, 1W3, 1W4, 1W5, 2W1, 2W2, 2W3, 2W4, 2W5 of the two receiving coils 16A, 16B.

Figure 7:
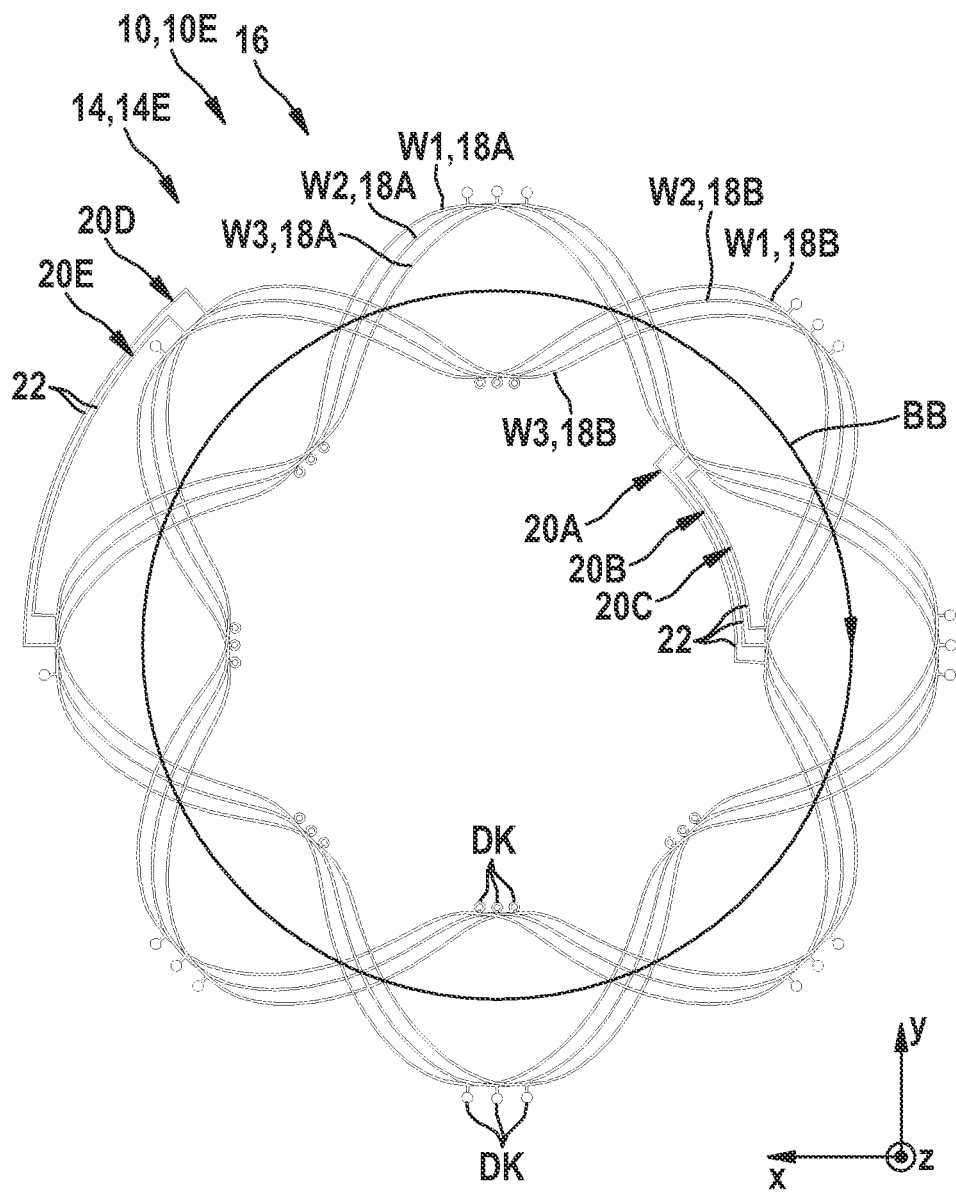
FIG. 7 shows a schematic plan view of a fifth exemplary embodiment of a measured value acquisition device according to the disclosure for an inductive sensor arrangement, with a circuit carrier of the measured value acquisition device being illustrated as transparent.

As can be further seen from FIG. 7, in the fifth exemplary embodiment shown, the measured value acquisition device 10E comprises a receiving structure 14E with a receiving coil 16 similar to the first exemplary embodiment. The receiving coil 16 comprises three windings W1, W2, W3, which each have two loop structures 18A, 18B with four periodically repeating loop portions such that the receiving structure 14E and the receiving coil 16 have a periodicity of four (p=4). Similar to the first exemplary embodiment, the periodically repeating loop portions correspond to a full period of a sinusoidal waveform, and the portions of the individual loop structures 18A, 18B arranged in different planes of the circuit carrier 12 each correspond to half a period of the repeating loop portions. The portions of the periodically repeating loop portions arranged in different layers are electrically connected to each other via through-contacts DK.

The number N of the connecting structures 20A, 20B, 20C, 20D, 20E of the receiving coil 16 is calculated in a manner similar to the previous embodiments according to Equation (G1). As can be further seen from FIG. 7, the measured value acquisition device 10E in the illustrated exemplary embodiment comprises five connecting structures 20A, 20B, 20C, 20D, 20E each with two connecting elements 22A, 22B for the receiving coil 16. The manufacture of the electrical series connection of the three windings W1, W2, W3 is analogous to the embodiments in FIGS. 1 and 2 of the first exemplary embodiment. Unlike in the previous exemplary embodiments, the connecting structures 20A, 20B, 20C, 20D, 20E of the receiving coil 16 are arranged in the area of the inner radius and in the area of the outer radius of the area of the circuit carrier 12 covered by the receiving coil 16. As can be further seen from FIG. 7, three connecting structures 20A, 20B, 20C are arranged in the area of the inner radius and two connecting structures 20D, 20E are arranged in the area of the outer radius.

What is claimed is:
1. A measured value acquisition device for an inductive sensor arrangement, comprising:
a circuit carrier which covers a movement path of a coupling device having at least one electrically conductive coupling element which is coupled to a movable body whose movement is intended to be acquired, wherein
the circuit carrier comprises at least one receiving structure which comprises at least one receiving coil having at least two windings electrically connected in series,
a single winding of the at least one receiving coil includes two loop structures including periodically repeating loop portions and extends across the movement path of the coupling device and is formed in at least two planes of the circuit carrier, respective portions of the two loop structures are electrically connected to each other via through-contacts, the periodically repeating loop portions of the two loop structures feature opposite directions of passage, the two loop structures are arranged offset from one another in a direction of the movement path by a predetermined distance, the two loop structures are separated at at least one separation point and are connected to each other via at least one connecting structure such that the at least two windings are electrically connected in series, and the at least one connecting structure comprises at least two connecting elements which are arranged in at least two parallel planes and feature opposite directions of passage.

2. The measured value acquisition device according to claim 1, wherein the at least two parallel planes at least partially overlap each other.

3. The measured value acquisition device according to claim 1, wherein:

the periodically repeating loop portions each correspond to a complete period of a sinusoidal waveform, or a rectangular waveform, or a triangular waveform; and a number of the periodically repeating loop portions defines a periodicity of the at least one receiving structure.

4. The measured value acquisition device according to claim 1, wherein portions of the two loop structures arranged in the at least two planes of the circuit carrier correspond to a half or to a quarter of a period of the periodically repeating loop portions.

5. The measured value acquisition device according to claim 1, wherein the at least one separation point is formed at a through-contact of the two loop structures.

6. The measured value acquisition device according to claim 1, wherein at least one analysis and control unit is configured to receive and evaluate induced signals in the at least one receiving structure.

7. The measured value acquisition device according to claim 6, wherein the at least one analysis and control unit is looped into a connecting element of the at least one connecting structure.

8. The measured value acquisition device according to claim 1, wherein loop structures of the two loop structures of different windings or of a same winding of the at least one receiving coil are configured to be connected to each other by the at least one connecting structure.

9. The measured value acquisition device according to claim 8, wherein the at least two connecting elements between the two loop structures provides a change in the direction of passage.

10. The measured value acquisition device according to claim 1, wherein a number of the at least one connecting structure is based on a number of the at least two windings.

11. The measured value acquisition device of claim 1, wherein the predetermined distance between the two loop structures of the at least one receiving structure is based on a number of the at least one receiving structure and on a number of the at least one receiving coil and on a number of the at least two windings of the at least one receiving coil and on a periodicity of the at least one receiving structure.

12. The measured value acquisition device according to claim 1, wherein the predetermined distance between the two loop structures and a distance between the at least two windings of the at least one receiving coil of a single receiving structure of the at least one receiving structure are equal.

13. The measured value acquisition device according to claim 1, wherein the two loop structures of the at least two windings of a plurality of the at least one receiving coil are arranged alternately or after the at least one receiving coil grouped along the movement path.

14. The inductive sensor arrangement for acquiring the movement of the movable body, comprising:

the coupling device coupled to the movable body; and the measured value acquisition device according to claim 1, wherein at least one exciter structure is arranged on the circuit carrier of the measured value acquisition device, wherein the at least one exciter structure is coupled to at least one oscillator circuit which, during operation, couples a periodic change signal in the at least one exciter structure, wherein the coupling device is configured to influence an inductive coupling between the at least one exciter structure and the at least one receiving structure of the measured value acquisition device, and wherein at least one analysis and control unit is configured to receive and evaluate signals induced in the at least one receiving structure and to determine a current position of the movable body.

15. The inductive sensor arrangement according to claim 14, wherein the movable body performs a rotational movement about a rotational axis or performs a linear movement.

\* \* \* \* \*